April 24, 1951 — E. DAMOND — 2,550,534

VIBRATING SUSPENSION APPARATUS

Filed Aug. 4, 1947

INVENTOR.
Emile Damond
BY

Patented Apr. 24, 1951

2,550,534

UNITED STATES PATENT OFFICE 2,550,534

VIBRATING SUSPENSION APPARATUS

Emile Damond, Paris, France

Application August 4, 1947, Serial No. 765,837
In France December 17, 1943

Section 1, Public Law, 690, August 8, 1946
Patent expires December 17, 1963

3 Claims. (Cl. 259—1)

This invention relates to vibrating suspension apparatus adapted to impart vibrations of suitable frequency and amplitude to objects or members or assemblies of members, and it has for its object improved vibrating suspension apparatus of this kind.

These apparatus, which are themselves suspended from one or several points that are practically free from vibrations, are useful in a great number of industries, whether mechanical, chemical or electro-chemical. For example, in a foundry, vibrations accelerate the operations of stripping, or ramming, or cleaning castings; it has a similar effect in the manufacture of conglomerates and of moulded pieces in concrete or various plastic materials in electro-plating, it expedites galvanic processes, etc.

The apparatus, object of the invention, are given dimensions and configurations adapted to suit the weight, the bulk and the nature of the pieces under treatment. They may be provided with any device permitting the object or piece to which they impart a vibratory motion to be held, transported, tilted or released, this being performed in the most convenient manner. The point or the points from which they are suspended may be fixed, or may have a movement of translation along any suitable path, in which latter case this point or points may be affected with accidental vibration generally or irregular frequency. Their essential feature is one or more vibrators, whether rotary or of any other type, of any nature: electrical, electro-magnetic, pneumatic, mechanical or other, so selected that their power and the nature of the vibrations they impart to the pieces under treatment be suitable with respect to the weight of the said pieces and to the results to be obtained, and that the frequency of said vibrations differs by a safe amount from the resonance frequency of the combination of apparatus set in vibration by the said vibrator or vibrators.

According to the invention, I provide an apparatus adapted to be suspended from a point or points that are practically free from vibrations, comprising one or more vibrators of any suitable kind actuated by any suitable agent, adapted to impart vibrations to the said apparatus and to any object, piece, member or assembly of members suspended thereto, and means for suspending said object, piece, member or assembly of members to the said apparatus, said means being such as to transmit to the latter the vibrations produced by the vibrator or vibrators.

The nature of the invention will be better understood by reference to the appended drawings, which represent, by the way of examples only that are by no means limitative, apparatus according to the invention, adapted for use in connection with various applications.

Figure 1:
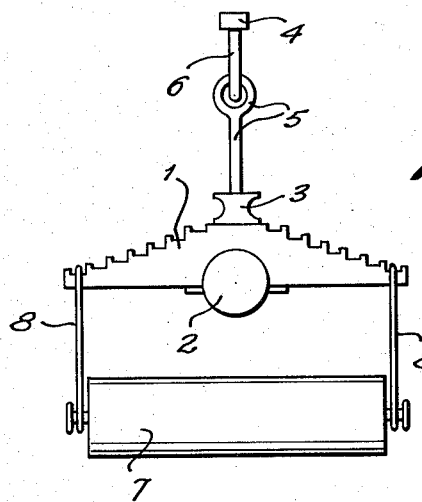
Fig. 1 is a diagrammatic elevation of a vibrating swingle-bar to which is suspended a foundry frame.

In Fig. 1, 1 is a swingle bar set in vibration by a vibrator 2 of any suitable type, and suspended by means of a vibration damping device 3, a rod and ring 5 and a cable 6 to a member 4 which is not vibrating, and which may be fixed or moving, for example, it may be the hook of a lifting apparatus or of a travelling or other crane.

The object to be vibrated, in this case a foundry frame 7, is suspended from the bar 1, by rods 8 hooked on stepped teeth provided on the said bar; this arrangement enables these rods 8 to be spaced at a more or less great distance apart according to the dimensions of the object to be suspended thereto.

The vibrations imparted by the vibrator 2 to the beam or rod 1 are transmitted by the rigid rods 8 to the frame 7, the stripping of the casting in which is achieved almost instantaneously by the vibration imparted to it by the beam or bar 1. The object 7 may be any other object, for example a mould for concrete.

Figure 2:
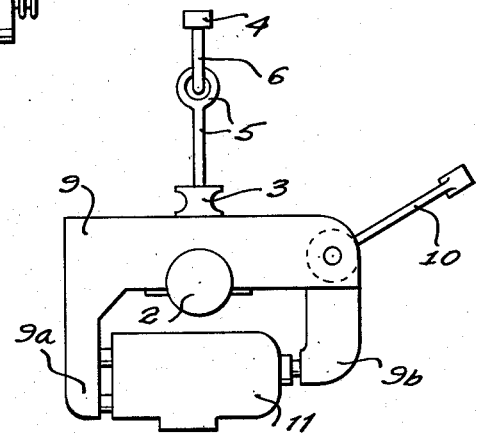
Fig. 2 is a diagrammatic elevation of a vibrating pair of co-acting jaws in which is held the casting of a casing for a gear-box which is undergoing cleaning.

In Fig. 2, the vibrating beam or bar is replaced by the co-acting jaws 9a and 9b of a vice 9 set in vibration by the vibrator 2, and suspended in the same manner as shown in Fig. 1. The jaw 9a is fixed while the jaw 9b is movable and adapted to be operated by a controlling lever 10 so as to hold tightly the object 11 undergoing treatment, which is here a casting of a casing for gear-box, the cleaning of which is performed in a few seconds by the vibrations communicated to it by the jaws of the vice.

Figure 3:
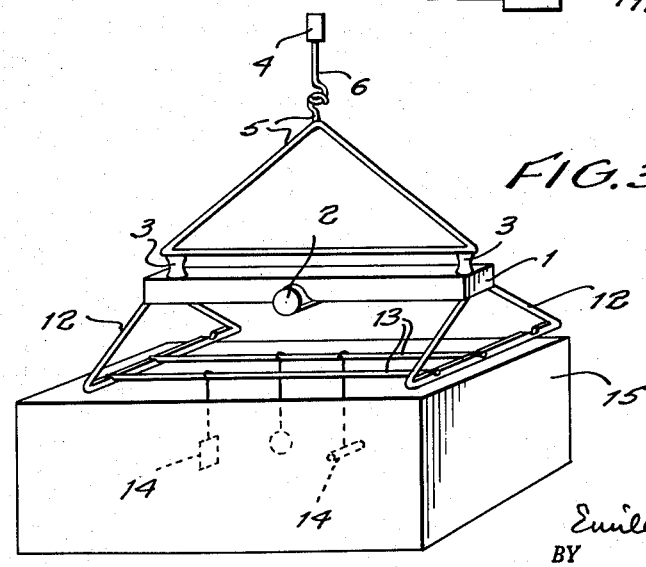
Fig. 3 is a perspective view of an electro-plating trough in which are suspended, from an apparatus according to the invention, the articles to be electro-plated.

In Fig. 3, a beam 1 is suspended by means of two damping devices to a swingle-bar 5, suspended from a fixed member 4 in the same manner as shown in Figs. 1 and 2. Instead of being fixed, the member 4 may be the hook of a winch or of a tackle adapted to withdraw from the electro-plating vat 15 the articles 14 suspended from rods 13 resting on stirrups 12 rigidly connected to the beam 1. The vibrations communicated to the objects 14 are for the purpose of freeing these articles from the gas bubbles which adhere to them, and stirring the electrolyte so as to maintain a proper concentration of the metal to be deposited in the vicinity of the articles, thereby considerably accelerating the electro-plating process.

It is obvious that these applications are only a few among the many uses to which may be put apparatus according to the invention, and that all desired modifications of form and of details of constructions may be made to the said apparatus, according to the use for which these are intended, without departing from the spirit of the invention, as defined by the statement of claim. The apparatus according to the invention can, for example, be caused to vibrate in any desired manner, circular or along any other curved path, horizontally, vertically or in an oblique direction, or in any combination of these motions, whether continuously or alternately, so as to vary the nature of the treatment that is given to the object or article or member or assembly of members that is subjected to the vibrations, said various kinds of vibration being obtained through the agency of any suitable mechanism, which latter mechanisms I do not claim as my invention.

What I claim is:

1. An apparatus of the kind described comprising in combination an elongated support member; a plurality of movably interconnected relatively rigid elements for suspending said support member from a relatively stationary part, the said elements being disposed intermediately of the ends of said support member; vibration damper means interposed between said support member and said interconnected elements; arms extending from the ends of said support member for maintaining a part to be vibrated; and a vibration mechanism secured to the lower face of said support member intermediately of the ends of the same.

2. An apparatus of the kind described comprising in combination an elongated support member; a plurality of movably interconnected relatively rigid elements for suspending said support member from a relatively stationary part, the said elements being disposed intermediately of the ends of said support member; vibration damper means interposed between said support member and said interconnected elements; arms extending downwardly from the ends of said support member for maintaining a part to be vibrated; and a vibration mechanism secured to the lower face of said support member intermediately of its two ends.

3. An apparatus of the kind described comprising in combination an elongated support member; a plurality of movably interconnected relatively rigid elements for suspending said support member from a relatively stationary part; vibration damper means interposed between said support member and said interconnected elements; arms extending downwardly from the ends of said support member; suspension means attached to said arms for maintaining a part to be vibrated; and a vibration mechanism secured to the lower face of said support member intermediately of the ends of the same.

EMILE DAMOND.

REFERENCES CITED

The following references are of record in the file of this patent:

UNITED STATES PATENTS

| Number | Name | Date |
|---|---|---|
| 1,447,694 | Stoney et al. | Mar. 6, 1923 |
| 1,556,645 | Stoney et al. | Oct. 13, 1925 |
| 1,695,127 | Stoney et al. | Dec. 11, 1928 |
| 2,298,252 | Davis | Oct. 6, 1942 |
| 2,301,947 | Hannen | Nov. 17, 1942 |

FOREIGN PATENTS

| Number | Country | Date |
|---|---|---|
| 798,828 | France | Mar. 11, 1936 |